(12) United States Patent
Xu et al.

(10) Patent No.: US 7,925,515 B2
(45) Date of Patent: Apr. 12, 2011

(54) METHOD, SYSTEM AND DEVICE FOR ENABLING THE PUBLIC TO ACCESS ORGANIZATIONS' DIRECTORIES

(75) Inventors: Xinyi Xu, Brossard (CA); Yiwen Xu, Brossard (CA)

(73) Assignee: Wenshine Technology Ltd., Brossard (CA)

( * ) Notice: Subject to any disclaimer, the term of this patent is extended or adjusted under 35 U.S.C. 154(b) by 251 days.

(21) Appl. No.: 11/876,291

(22) Filed: Oct. 22, 2007

(65) Prior Publication Data

US 2009/0106035 A1 Apr. 23, 2009

(51) Int. Cl.
*G06Q 10/00* (2006.01)
(52) U.S. Cl. .......................................... 705/1.1
(58) Field of Classification Search ....................... 705/1
See application file for complete search history.

(56) References Cited

U.S. PATENT DOCUMENTS

| | | | |
|---|---|---|---|
| 6,341,316 B1 * | 1/2002 | Kloba et al. ................. | 709/248 |
| 6,587,835 B1 | 7/2003 | Treyz et al. | |
| 6,954,735 B1 | 10/2005 | Djupsjobacka et al. | |
| 7,195,157 B2 | 3/2007 | Swartz et al. | |
| 7,231,380 B1 | 6/2007 | Pienkos | |
| 2002/0026325 A1 | 2/2002 | Hirahara et al. | |
| 2002/0026380 A1 | 2/2002 | Su | |
| 2004/0093274 A1 | 5/2004 | Vanska et al. | |
| 2005/0021364 A1 | 1/2005 | Nakfoor | |
| 2005/0021365 A1 | 1/2005 | Nakfoor | |
| 2007/0203836 A1 | 8/2007 | Dodin | |

FOREIGN PATENT DOCUMENTS

| | | |
|---|---|---|
| WO | WO 2004/061734 A1 | 7/2004 |
| WO | WO 2006/034139 A3 | 3/2006 |
| WO | WO 2007/095491 A3 | 8/2007 |

OTHER PUBLICATIONS

Onliine pub; anywhereERP . . . ; 2006.*
Online pub; A Scalable . . . for the Internet; Jul. 11, 1995; T. Howes, M. Smith.*

* cited by examiner

*Primary Examiner* — Jonathan Ouellette
(74) *Attorney, Agent, or Firm* — Jean C. Edwards, Esq.; Akerman Senterfitt LLP

(57) ABSTRACT

A real-time directory access system provides the public with information of interest of an organization, and enabling mobile personal communication devices to access the organization's information of interest and to interactively communicate with the organization. This system includes an organization's central data server, a plurality of branch data servers for storing branch information of interest and for interactively communicating with mobile devices, a plurality of in-branch access points for distributing information of interest. The system also includes a plurality of mobile personal communication devices for receiving and displaying information of interest from access points and interactively communicating with branch data servers.

25 Claims, 5 Drawing Sheets

METHOD, SYSTEM AND DEVICE FOR ENABLING THE PUBLIC TO ACCESS ORGANIZATIONS' DIRECTORIES

CROSS-REFERENCE TO RELATED APPLICATIONS

This is the first application filed for the present invention.

TECHNICAL FIELD

This invention relates, in general, to enabling the public to access organizations' elements of interest (product and service information). In particular, a method, system and device are provided for allowing an organization to publicize information regarding elements of interest and for facilitating public access to the publicized information in a simple and efficient manner.

BACKGROUND ART

An organization would like to publicize in a simple and efficient manner the information regarding elements of interest (promotions, discounts, new arrivals, product locations, real-time stock, reservation, appointment, and schedule delay). The public, in turn, would like to access this information. The organization could be an established business entity, a government agency, or an institution. In the case where the organization is an established business entity, for example a retail corporation, the information of interest includes promotions, new product arrivals, product locations and real-time in-stock information. In the case where the organization is a government agency, the information of interest includes building directory and service availability. In the case where the organization is an institute, for example a health center, the information of interest includes building directory, appointment schedule and service delay (waiting time for a doctor making his/her appointment).

There are no existing technologies that answer these needs, although several methods and systems are disclosed for some simple cases.

U.S. Pat. No. 5,630,068 (Vela et al.) entitled "Shoppers Communication System and Processes Relating Thereto" discloses a communication system and processes for communicating with shoppers using devices installed on shopping carts.

U.S. Pat. No. 6,954,735 (Djupsjobacka et al.) entitled "Method and system of shopping with a mobile device to purchase goods and/or services" discloses a method for facilitating shopping with a mobile device for a user with a list of to-buy products.

U.S. Pat. No. 7,069,238 (I'Anson et al.) entitled "Shopping assistance service" discloses a shopping assistance method and a location-based service system.

U.S. Pat. No. 7,195,157 (Swartz et al.) entitled "Consumer interactive shopping system" discloses a consumer interactive shopping and marketing system using a portable data terminal.

U.S. Pat. No. 7,231,380 (Pienkos) entitled "Apparatus and method for providing products location information to customers in a store" discloses a method for providing products location information to customers using in-store data terminals.

U.S. Patent Application Publication 20010028301 (Geiger et al.) entitled "Electronic shopping cart display system" discloses an advertising and promotion system.

U.S. Patent Application Publication 20070150331 (Perri et al.) entitled "Method and apparatus for marketing retail goods" discloses a system for collecting marketing data.

None of the aforementioned patents and applications provide a solution to the needs of publicizing an organization's information of interest and facilitating easy public access to this information. Accordingly, there exists a need for a technology that would enable the public to access information of interest of organizations in a simple and efficient manner.

SUMMARY OF THE INVENTION

In general, this invention relates to an interactive real-time information access technique for enabling an organization to publicize its product and service information and facilitating public access to the publicized information. In particular, a system, method and device are provided for accessing static and dynamic product and service information of an organization in a simple and efficient manner.

Accordingly, one aspect of the present invention entails a system for providing members of the public with directory information of an organization, for enabling a mobile personal communication device to access dynamic directory data of the organization and to interactively communicate with the organization. The system comprises a central data server for storing directory information of the organization, a plurality of branch data servers connected to the central data server for storing branch directory data, and for interactively communicating with a mobile personal communication device, a plurality of access points for receiving branch directory data from the branch data server, and for distributing the directory data, a plurality of mobile personal communication devices for receiving the directory information of a local branch from an access point, displaying the directory information, and interactively communicating with the branch data server.

Another aspect of the present invention entails a method of distributing directory information of an organization. The method comprises steps of storing directory information of the organization in branch data servers located in local branches of the organization, the branch data servers being connected to a central data server of the organization, and providing, in each local branch, at least one access point for receiving branch directory data from the corresponding branch data server and for distributing the directory data of the local branch to a mobile personal communication device configured to display, on a display of the mobile personal communication device, the directory information of the local branch.

Still another aspect of the present invention entails a method of enabling a mobile personal communication device to access directory information of an organization. The method comprises steps of downloading directory data from an access point in a local branch of the organization, the access point receiving branch directory data from a branch data server communicatively connected to a central data server of the organization and displaying directory information on a display of the mobile personal communication device based on the directory data downloaded from the access point.

Yet a further aspect of the present invention entails a mobile personal communication device comprising a software component for accessing directory information of an organization. The device comprises a processor coupled to memory for supporting software applications, a communication means for receiving directory data from an access point disposed in a branch of the organization, and a directory access software application that receives the directory data and displays directory information based on the directory data received from the access point.

Yet a further aspect of this invention entails a computer program product comprising code which, when loaded into memory and executed on a processor of a mobile personal communication device, is adapted to perform the steps of obtaining directory data from an access point that is communicatively connected to a branch data server located in a branch of an organization, and displaying, on a display of the device, directory information based on at least some of the directory data received from the access point.

This novel technology facilitates accessing an organization's static product/service location information via a very simple user interface, and accessing an organization's dynamic product in-stock/service information and making real-time reservation via automated, interactive voice and/or text messages.

BRIEF DESCRIPTION OF THE DRAWINGS

Further features and advantages of the present invention will become apparent from the following detailed description, taken in combination with the appended drawings, in which.

DETAILED DESCRIPTION

By way of general introduction, and as will be elaborated below, a publicly-accessible Directory system allows an organization to publicize information of interest to the public and to enable a person to access an organization's product and service information with a mobile personal communication device.

System Overview

Figure 1:
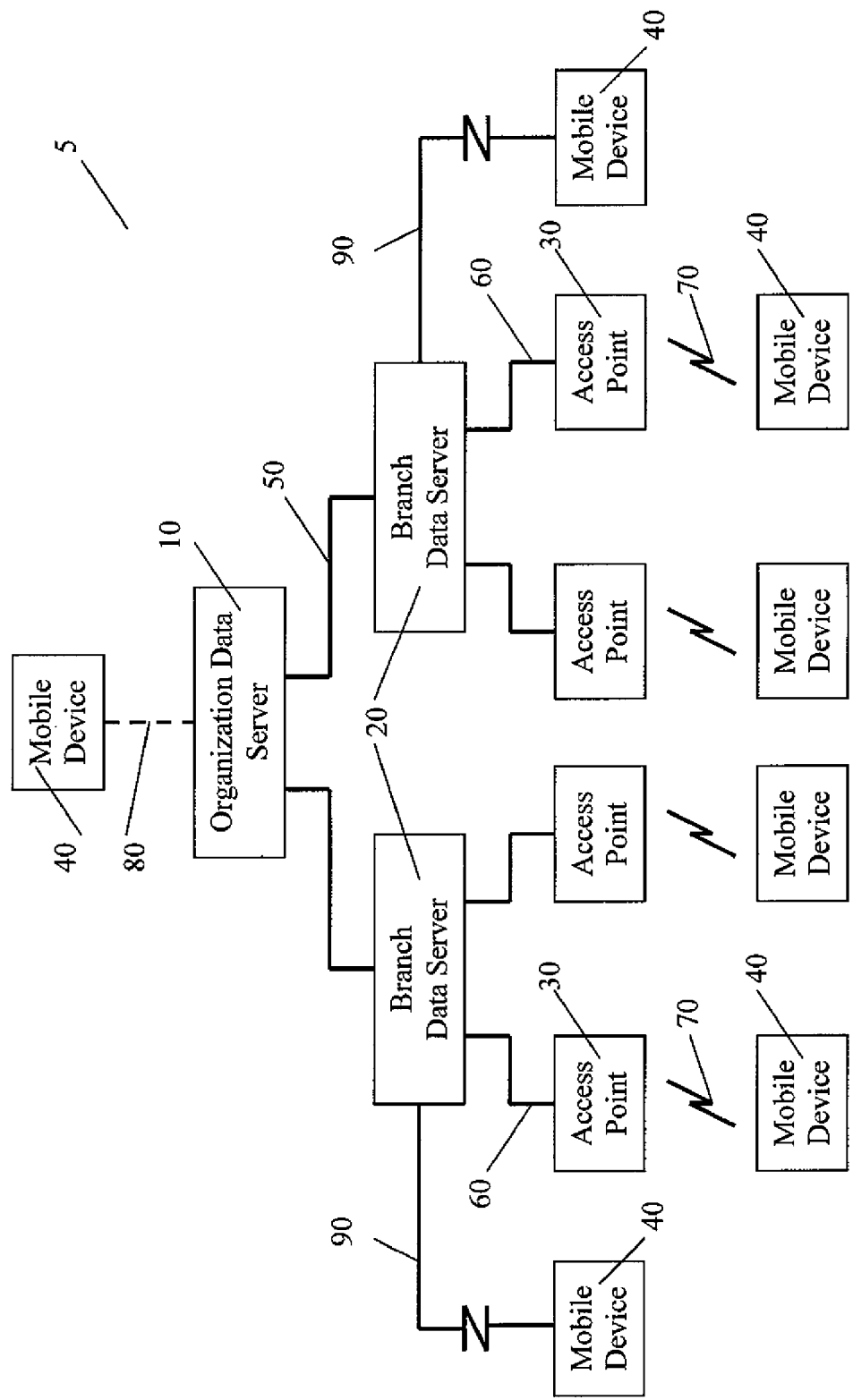
FIG. 1 schematically depicts an embodiment of the invention and generally shows the relation of components of the system.

FIG. 1 depicts such a system 5, by way of example, that consists of an Organization Data Server 10, a plurality of Branch Data Servers 20, a plurality of in-branch Access Points 30, and a plurality of Mobile Devices 40 (mobile personal communication device). The Organization Data Server, Branch Data Servers, and in-branch Access Points are information providers, while Mobile Devices are information consumers of the system of the invention.

Typically, a large organization—an established business entity, a government agency, or an institution—has many separate locations across a given territory. It has a headquarters, and a plurality of branches. For an established business entity, such as a retail corporation, branches include local retail stores, warehouse stores, or sales outlets, all over the world. For a federal government agency, the branches include offices in states, provinces, and cities across the nation. For a regional tourism agency, the branches include airports, seaports, train terminals and tourist information centers.

A centralized Organization Data Server 10 is set up to store information of interest of the organization. For the same purpose, a Branch Data Server 20 is also set up at each of the organization's branches. Branch Data Servers communicate with the Organization Data Server and other Branch Data Servers via the Internet connection 50.

For a retail corporation, the information of interest might include branch address, branch contact phone number, new arrivals, on-sale products and other promotions, product locations, and real-time product stock information. For a federal government agency, the information of interest might include branch address, branch contact phone number, and directory information regarding its customer services, available programs, appointment-booking tables, and real-time appointment schedule. For a regional tourism agency, the information of interest might include transportations, hotels, eating places, attractions, and discount tickets.

All information of interest can be placed into one of two categories: static data and dynamic data. On a given day, branch address and branch phone number, new product arrivals, and product locations would be examples of static data. Real-time product in-stock information would be an example of dynamic data.

For reasons that would be readily apparent to those of ordinary skill in the art, the Organization Data Server 10 only keeps each branch's static data; such as new arrivals, discounts, and product location information. The critical responsibility of the Organization Data Server is to query Branch Data Servers 20 and to accept and respond to queries from the Branch Data Servers. A Branch Data Server maintains both static data and in-branch dynamic data (real-time in-branch product stock information). A Branch Data Server also knows, via queries of the Organization Data Server, real-time product stock information regarding other branches. This is accomplished by the Branch Data Server querying the Organization Data Server which further dispatches queries to other Branch Data Servers, returning the result to the original Branch Data Server.

A plurality of Access Points 30 is set up in each branch of the organization to facilitate access to the organization's information of interest by the system users or consumers, i.e. the members of the public. In the case where a branch has multiple entrances, at least one Access Point will typically be installed at each entrance. Access Points communicate with the in-branch Branch Data Server via a local area network connection 60.

From time to time an Access Point 30 receives up-to-date branch-specific information regarding elements of interest from its Branch Data Server. Access Points have a means to allow the information that it receives to be accessed by users. The static in-branch information is broadcast by the Access Point and received by mobile devices through an over-the-air link 70. The static branch-specific information can also be received by mobile devices via an Internet connection 80 directly from the Organization Data Server 10.

In branches where it is not necessary to have a plurality of Access Points, the Access Point component and Branch Data Server application may execute on the same physical server.

A mobile personal communication device (mobile device) 40 has a communication means for receiving directory data, i.e. to receive information of interest provided by the organization, either via over-the-air link 70, or through an Internet connection 80. In other words, the communication means can be either a radiofrequency transceiver for wirelessly downloading directory data or a communications port for receiving directory data via cable, e.g. by USB. A Mobile Device 40 has a software component, named "Diral Client" 406, which is described below, to allow the user of the mobile device to browse static information, such as new arrivals, promotions, and product locations in a retail store.

The software component Diral Client 406 of the mobile device 40 further allows the user to query dynamic product and service information, or to make a reservation, via an interactive voice response or an interactive text response, that is supported by the Branch Data Servers. To accomplish this task, the Mobile Device 40, upon the user selection of some element of interest, sends a message, using a wireless telephony service 90 to the Branch Data Server. The branch contact number is included in the branch data broadcast and received by the mobile device. The message includes information regarding the element of interest and an action type. The Branch Data Server, when receiving the message from the mobile device, searches its own database or other branch databases by way of querying the Organization Data Server. The Branch Data Server will then initiate an interactive voice response call, or an interactive text response process with the mobile device, and guide the user of the mobile device to complete the dynamic information query task.

Method Overview

An organization, which can be an established business entity, a government agency, or an institution, has information regarding elements of interest it wishes to share with the public. In turn, the public would like access this information. This invention proposes a method that allows an organization to publicize information regarding elements of interest, and also facilitates public access to the publicized data in a simple and efficient manner.

An organization has a headquarters and a plurality of branches. Information regarding elements of interest is stored on the organization's data servers. The organization has one central Organization Data Server 10 located in its headquarters, and one Branch Data Server 20 at each of its branches. The organization's servers are interconnected via the Internet and the organization's intranet. Data can be transferred within the organization between each branch and the headquarters via an Internet or intranet connection.

An organization has a unified set of elements of interest across all its branches. A branch, however, may have additional branch-specific elements of interest. We refer to the information of elements of interest, both the organization's unified set and the branch-specific set, as branch "Directory" information. Directory information can be static or dynamic. Static Directory information of a retail corporation will include branch address, branch phone number, new arrivals, promotions, and product locations. Static information is relatively stable, it might not change in a day or in a week. Dynamic information changes over time, often by the minute. For example, the in-stock data of a product at a retail corporation branch is dynamic, because the number of the product on shelf and/or in stock at a branch changes as products are purchased at a point of sales at the branch or reserved over the Internet at the company's website. For an organization providing a professional service, a hospital for instance, the waiting time for a doctor making his/her appointment is dynamic.

Both static and dynamic branch Directory information are stored in the Branch Data Server. Static Directory information of a branch could also be stored in the organization's central Organization Data Server. Therefore, the central headquarters' data server has the static Directory information of each of its branches. The advantage of storing branch's static Directory data in the Organization Data Server is that the Directory consumers, shoppers of a retail store, patients visiting doctors, or taxpayers visiting government offices, can access and download the static Directory data of interest from the organization's website before traveling to the branch, or without having to physically travel there.

A more common way to retrieve the branch Directory data, however, is to retrieve it at the branch's physical location. To enable this, a plurality of Access Points 30 is installed in each branch. The Access Points are connected to the respective Branch Data Server 20 by way of a local area network connection. These Access Points receive the static branch Directory data from the Branch Data Server and transfer the static Directory data to members of the public via over-the-air broadcasting and/or on-request downloading 70. Access Points are deployed across the organization's branches. At least one Access Point is preferably installed at each of the branch's entrances. Access Points can also be installed at other high-traffic choke points within a branch, for instance at a client service center.

The data distributed by an Access Point to the public includes a location identifier, for example a GPS coordinate, of the Access Point, a version number of current version of data, and the static branch Directory data that the Access Point received from the Branch Data Server.

In the case where Access Points distribute the static branch Directory data by means of wireless broadcasting, both Wi-Fi and Bluetooth™ technologies can be employed to enable this broadcasting. Bluetooth™ broadcasting can be carried out at the branch's entrances, while Wi-Fi broadcasting could be used at the branch's central point. The coverage range of the broadcasting should be limited to a relatively small area, so that the broadcasting from one organization's branch does not interfere with the broadcasting of a neighboring organization.

Access Points also have a means for the static branch Directory data to be downloaded to a mobile personal communication device (mobile device 40) via a cable connection, such as a USB cable connection. To receive the Directory data in this way, the user of the mobile device connects the mobile device with an Access Point using a cable and downloads the Directory data from the Access Point to the mobile device.

A software application, Diral Client, is installed in the mobile device 40 to interface with the Access Point. The Diral Client has three (3) major functions: (1) to receive static branch Directory data from Access Point broadcasts, from Internet download, or from direct Access Point download; (2) to display the static branch Directory information to the user of the mobile device; and (3) to communicate with the Branch Data Server for dynamic Directory information and respond to the Branch Data Server during an interactive voice response or an interactive text response. The detailed functionality of the mobile device will be described in the following section.

A mobile device equipped with a Diral Client is said to be "Diral-enabled". It follows that an organization that supports the functionalities of Branch Data Server and Access Point will be referred to as "Diral-enabled" organization.

Users equipped with a Diral-enabled Mobile Device are able to access and view branch Directory information. A Diral-enable mobile personal communication device user is also capable of establishing communication with the Branch Data Server to access the organization's dynamic Directory data and to explore the organization's other service options. To use this feature, the user must register his/her Diral-enabled mobile device with the organization, and create an account to specify payment options, credit card details, billing address, and other information that is required for account creation, i.e. setting up an account with the organization to facilitate purchasing of goods or services using the mobile personal communication device. This registration with the organization can also be done at the organization's website over the Internet. Similarly, the status of transactions performed using the Diral-enabled mobile device can optionally be viewed by logging into the organization website.

Users intending to explore only the static Directory information of an organization need not register. Further, they can use mobile devices without personal communication functionality. These users are able to access and view static branch Directory information of Diral-enabled organizations as long as their mobile devices are Diral-enabled.

The registered user of a Diral-enabled mobile device visits a branch of an organization and receives static branch Directory information from an Access Point through methods described above. Upon browsing the Directory information, the user decides to explore and pursue further listed service options. For example, the user browses inventory information and decides to reserve a particular product. This requires establishing dynamic communication with the Branch Data Server.

An example of such a need could be the following: the user browses the product list, selects a product, and finds the product location using the Diral Client user interface. The user approaches the location and finds the shelf to be empty. The user can then choose to check the product stock information using the Diral Client. The Diral Client queries the Branch Data Server for in-store product stock information and, if necessary, the product stock information of other branches. The query result is that the product is sold out in this branch, but there are still available items in a nearby branch. The Diral Client asks the user if he or she wants to make a reservation. The user answers yes. The Diral Client then signals the Branch Data Server with the user's selection. The Branch Data Server then initiates an interactive communication with the user, by way of interactive voice response or interactive text response, to guide the user to confirm the reservation and to make arrangements for payment and pickup or delivery.

When the user of a Diral-enabled mobile device signals the request for communication, a message is sent by the mobile device to the Branch Data Server. This message could be sent through a telephone system. The contact phone number of the Branch Data Server is included in the static branch Directory data and received by the Diral Client on the mobile device. The content of the message includes the mobile device ID, the mobile device's current location, the ID of the selected product, and the service type (or query type) that the user selects. The service type may include: query stock status only, or query stock and make reservation.

A mobile device's request for a communication will be served by interactive messaging, either in Interactive Voice Response (IVR), or in Interactive Text Response (ITR). To efficiently serve different requests, the IVR and ITR are organized and managed in such a way that the IVR or ITR process can be started at an entry point that directly relates to the immediate need of the request regarding its selected product and desired service.

The Branch Data Server initiates this dynamic communication process by contacting the Diral Client using the identification number it had previously received in the initiation request. When this mobile personal communication device is present in the branch, the communication between the Branch Data Server and the mobile device are local calls.

The Branch Data Servers may maintain these dynamic communications sessions in two different means, at the preference of the mobile device user, as Interactive Voice Response (IVR) (220) or Interactive Text Response (ITR) (224). If the user chooses to employ IVR, the Branch Data Server will initiate and maintain a telephone call session, a video call session, or employ other voice communications means to the user of the mobile device. If the user chooses to employ ITR, the Branch Data Server will initiate and maintain an interactive text messaging session to the user of the mobile device.

Branch Data Server, Mobile Device and Interactive Communication

Figure 2:
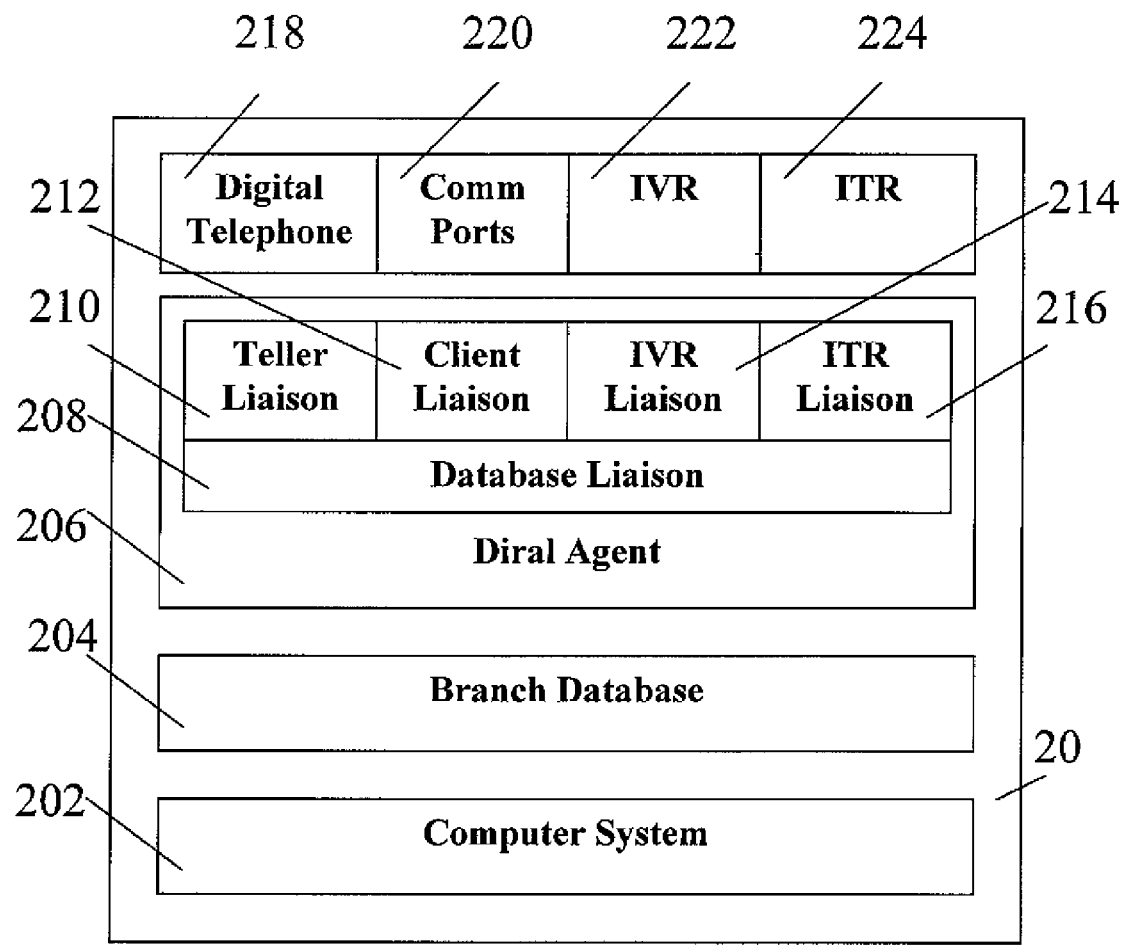
FIG. 2 is a block diagram of key functional components of a Branch Data Server, in which the present invention can be implemented.

FIG. 2 is a block diagram of key functional components of a Branch Data Server, in which the present invention can be implemented.

The Branch Data Server 20, as illustrated in FIG. 2, includes a basic computer system 202, a Branch Database 204, and a software application called "Diral Agent" 206. The Diral Agent 206 is the liaison between the Branch Data Server and mobile devices. The Branch Data Server 20 also has a telephone subsystem 218, communication ports 220, an Interactive Voice Response subsystem (IVR) 222, and an Interactive Text Response subsystem (ITR) 224.

The computer system 202 provides the hardware and software for supporting a database application and other user applications. The computer system has at least a Central Processing Unit (CPU), Random Access Memory (RAM), and a persistent storage. The computer system should also have an operating system (OS), software components implementing different types of communication protocols, and other software tools required to allow it to operate properly.

The Branch Database 204 stores and manages the Directory data, both static and dynamic, related to a branch. For an established business entity, the static data of a branch includes (but is not limited to) the branch address, contact phone number, new arrivals, current on-sale products and other promotions, product prices, product images, and product locations; The dynamic branch Directory information includes (but is not limited to) real-time product stock information. The Branch Database communicates with the Directory management software component, the Diral Agent. It also interfaces directly with company's sales management software, the Point of Sales (POS) software, to receive updates and maintain real-time product stock information.

From time to time, the Diral Agent 206 gets branch static Directory data from the Branch Database 204 and sends this data down to the Access Points of the branch. The data transaction can be accomplished in many different ways. One way is that the Diral Agent sends a signal for taking an update of the Directory information to the Diral Teller 304 of an Access Point 30, and the Diral Teller of the Access Point then downloads a new version of the static branch Directory data from the Branch Data Server. Another is that the said download happens when the Diral Teller needs to do so, for instance, when an Access Point gets a reboot.

The Diral Agent 206 has a module Database Liaison 208, Teller Liaison 210, a Client Liaison 212, an IVR Liaison 214, and an ITR Liaison 216. The Diral Agent's Teller Liaison 210 is the liaison between the Diral Agent 206 and the Diral Teller 304. It is responsible for informing the Diral Tellers of branch Access Points of availability of new updates of the static branch Directory data, and taking requests from Diral Tellers for downloading the branch Directory data.

The Diral Agent's Client Liaison 212 interacts with Diral Clients 404 of mobile devices 40. The Diral Agent receives signals directly from Diral Clients 404 of mobile devices. When the user of a Diral-enabled mobile device selects a product, or a service, and then selects an action for a special request, the Diral Client will send a message to the branch Diral Agent requesting interactive messaging. This message will first be received by the digital telephone 218 and further received by the Diral Agent. (This process will be further detailed in following discussions.) The Diral Agent, when receiving a request from a Diral Client for an interactive messaging, will initiate a conversation with the Diral Client, with interactions of the user of the Diral Client via either Interactive Voice Responding (IVR) 222 or Interactive Text Responding (ITR) 224.

The Diral Agent's IVR Liaison module 214 and ITR Liaison module 216 interface with the branch's IVR 222 and ITR 224 respectively. The IVR system and ITR system, as well as mobile radio systems and the digital telephone system, are considered to be third-party sub-systems being incorporated into the system of this invention. The Diral Agent's responsibility in this process is to trigger a signal, with proper content, for a corresponding system, IVR or ITR, to start a conversation or dialogue with the Diral Client and its user.

Figure 3:
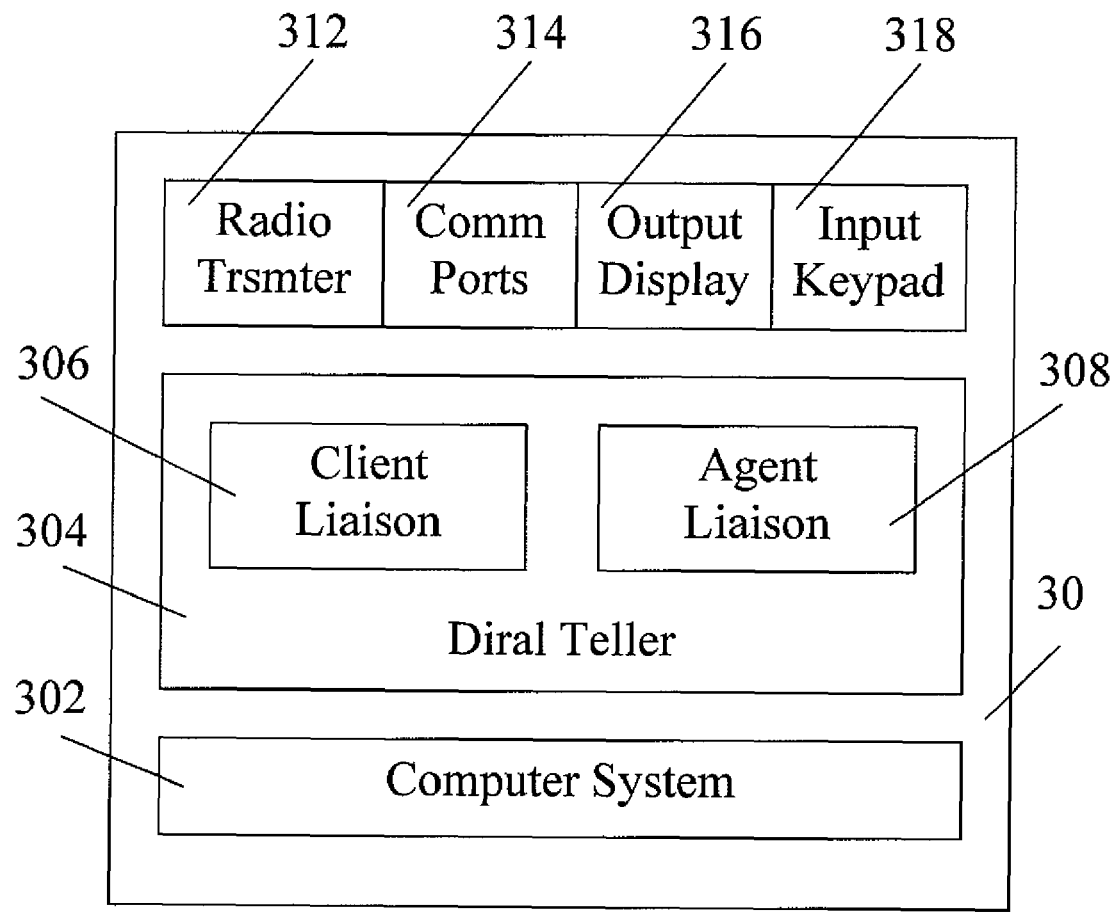
FIG. 3 is a block diagram of functional components of an Access Point firmware in which the present invention can be implemented.

FIG. 3 is a block diagram of functional components of an Access Point in which the present invention can be implemented.

The Access Point 30, as illustrated in FIG. 3, includes a computer system 302, and the Diral Teller software application 304. The Diral Teller 304 interacts with the Branch Data Server and mobile devices. The Access Point 30 also has a radio transmitter component 312, communication ports 314, an output display 316, and an input keypad 318.

The computer system 302 provides basic infrastructure, and the software and hardware for supporting user applications. The computer system has at least a Central Processing Unit (CPU), a Random Access Memory (RAM), and a storage device. The computer system should also have an operating system (OS), software components implementing different types of communication protocols, and other software tools required to make a computer system operate properly.

The Diral Teller 304 receives the Directory data related to a branch from the branch Data Server. For an established business entity, the static data of a branch includes, but is not limited to, the branch address, contact phone number, new product arrivals, current on-sale products and other promotions, product prices, product images, and product locations. A version number and the Access Point location can also be added to the data set.

From time to time, the Diral Agent 206 transmits the Directory data down to the Access Points within the branch. The data transaction can be accomplished in many different ways. One way is that the Diral Agent sends a signal to the Diral Teller 304 of an Access Point 30, informing the Diral Teller to take an update of the Directory data. The Diral Teller of the Access Point then downloads a new version of the static branch Directory data from the Branch Data Server. Another is that the download happens on an as-needed basis, for instance, when an Access Point is rebooted.

The Diral Teller 304 has a module Agent Liaison 306 that is responsible for interfacing with the branch Data Server for retrieving Directory data. The Diral Teller 304 also has a module Client Liaison 308 that distributes Directory data to mobile devices 40, more specifically to the Diral Clients 406 of mobile devices.

There are two (2) ways that a Diral Teller can distribute the Directory data. The first is to send the data through broadcasting, the other is to take requests from mobile devices and allow mobile devices to download Directory data via a cable connection. The Diral Tellers broadcast the Directory data via radio transmitter 312. In the case where Diral Tellers are installed at entrances of branches, Directory data is preferably broadcast using Bluetooth™. In the cases where Diral Tellers are installed within the branches, Directory data could be broadcast using Wi-Fi. As will be appreciated, other short-range wireless technologies could be substituted in lieu of Broadtooth or Wi-Fi.

A Diral Teller broadcasts Directory data periodically, at a predetermined, configurable time period. Directory data is broadcast in a well-defined format, which makes the broadcasting very efficient. In this way, one round of data broadcasting takes about a dozen seconds. For a branch which has 10,000 elements in its Directory, and for which each element has associated data having a maximum length of 100 characters (bytes), the total length of the Directory data is less than 1 mega byte. Bluetooth™ can transfer data at a rate of 1 megabit per second, so it would take 8 seconds to complete one round of broadcasting of 1 mega byte of Directory data in a plain text format. Wi-Fi performs even better than Bluetooth in terms of data rate. The foregoing is merely an example of a typical Directory size and should not be construed as limiting the size of the Directory or the size of the data associated with each element in the Directory.

The Diral Teller's Client Liaison 306 could interact directly with Diral Clients 404 of mobile devices 40 using COMM ports 314. One of those COMM ports could be a USB port. For mobile devices that are not equipped with Bluetooth™ or Wi-Fi, but do have a USB port, Directory data can be downloaded from an Access Point via the USB connection. The user of the Mobile Device connects the device to an Access Point using a USB cable, then presses a button on the input keypad 318 (or other user input device) of the Access Point to start downloading. The output display 316 of the Access Point can preferably show the downloading status and preferably display a message when the download is complete.

Figure 4:
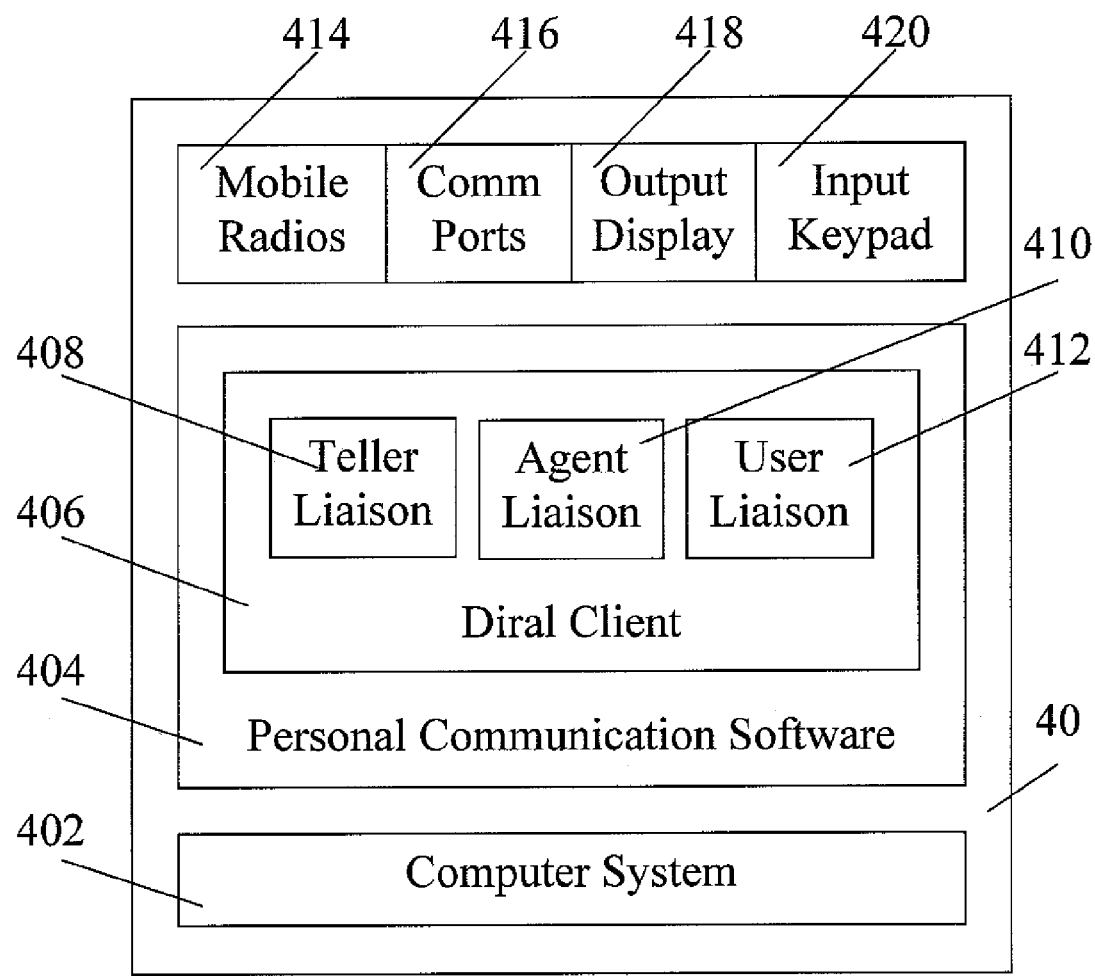
FIG. 4 is a block diagram of functional components of a mobile personal communication device (Mobile Device) in which the present invention can be implemented.

FIG. 4 is a block diagram of functional components of a mobile device (mobile personal communication device) in which the present invention can be implemented.

The mobile device 40, as illustrated in FIG. 4, includes a computer system 402 (i.e. a processor coupled to memory) for supporting a personal communication software application 404. The mobile device 40 also has one or more radiofrequency transceivers (i.e. mobile radios) 414 for cellular and short-range wireless communications, one or more communication ports 416 for cable or USB connections, an output display 418 (e.g. an LCD screen or graphical user interface), and one or more user input devices (e.g. keypad 420, thumbwheel, trackball, etc)

The computer system 402 provides basic means, software and hardware for supporting user applications. The computer system has at least a Central Processing Unit (CPU), a Random Access Memory (RAM), and a storage device. The computer system should also have an operating system (OS), software components implementing different types of communication protocols, and other software tools required to make a computer system operate properly.

The personal communication software application 404 has basic modules to manage regular personal communication functionalities, such as making and receiving calls or text messages, and editing and browsing phone books. The personal communication software application 404 also has a Diral Client component 406 for accessing Directory information. The Diral Client 406 has three (3) modules: Teller Liaison 408, Agent Liaison 410, and User Liaison 412.

The Teller Liaison 408 is responsible for receiving an organization's Directory data. There are two (2) different ways that a Diral Client can receive the Directory data. One is to receive the data from a Diral Teller's broadcasting. The Diral Client receives the data broadcast via mobile radios 414 using Bluetooth™ or Wi-Fi. The other is for a Diral Client to request directly from a Diral Teller, and download the Directory data via a cable connection.

Diral Tellers broadcast Directory data periodically. One round of broadcasting can be completed in about a dozen seconds. For a branch which has 10,000 elements in its Directory, it will take about 8 seconds for a Diral Teller to complete one round of broadcasting via the Bluetooth™ link. This means that, in a worst case, a Diral client is able to receive a complete set of Directory data in about 16 seconds.

For mobile devices that are not equipped with Bluetooth™ or Wi-Fi, but do have a USB communication port, Directory data can be downloaded from an Access Point 30 to the mobile device via USB. The user of the mobile device connects the device to an Access Point 30 using a USB cable, then presses a button on the input keypad 318 of the Access Point 30 to begin downloading. The output display 316 of the Access Point 30 preferably shows the download status and preferably displays a message when the download is complete.

The Diral-enabled mobile device can provide an option to turn the Diral service on or off. The Diral Client of a mobile device always runs in the background as long as the mobile device is powered up, whether or not the Diral service is turned on or off. If the Diral service is turned off for a given mobile device, the Diral Client of this mobile device will not save Directory data even though it detects a Diral Teller's broadcast. If the Diral service is turned on for a given mobile device, the Diral Client will automatically save and keep Directory information when the Diral Client detects a broadcast from a Diral Teller. When the Diral Client receives the complete Directory of an organization, the Diral Client preferably emits an audible alert to the user together with a text or other graphical display on the output display area 418 of the mobile device. Alternatively, the Diral Client can alert the user using only an audible alert or using only a text or graphical display on the output display. Alternatively, the Diral Client can display a special icon or symbol, cause a LED or other light to blink, cause the device to vibrate or cause the device to perform any other output that would alert the user. In yet another alternative, the Diral Client can be configured by the user not to alert the user in any way. Once the user has been alerted, however, the user of the mobile device can then launch the Diral Client's User Liaison 412 user interface (UI) to browse the Directory.

The Directory that Diral Clients receive from Diral Tellers includes only static data. In cases where the user requests dynamic Directory information, such as the real-time in-stock information for a product, the user triggers a process that lets the Agent Liaison 410 of the Diral Client 40 communicate with the Diral Agent 206 of the Branch Data Server 20. The Branch Data Server maintains the real-time product stock information for the branch. The Branch Data Server is also able to query other branch Data Servers for their real-time product stock data.

When the user of a Diral-enabled Mobile Device selects a product or a service, and then selects an action for a special request, the Diral Client sends a signal to the Diral Agent 206 of the Branch Data Server requesting interactive messaging. The Diral Agent, when receiving a request from a Diral Client for interactive messaging, will initiate a conversation with the Diral Client, with the user's interaction, via either Interactive Voice Responding (IVR) or Interactive Text Responding (ITR).

ITR has at least one advantage over IVR. When a user is involved in an IVR over a mobile personal communication device, the user has to move the device to near his/her ear, listen to available choices, then move the device to the front and press a key on the keypad of the device. The user will have to repeat this process if there are multiple rounds of selection in one IVR course. With ITR, the user could always keep the device in the front, watch available choices and make his/her choice.

In the following, we present one way to implement the ITR where we implement ITR as an enhanced text messaging.

Text messaging service sends a short text message to a mobile personal communication device. When the device receives a text message, the device emits an audible alarm and/or displays on the display area a note, symbol or icon indicating arrival of a new text message. The user can then read the message and send a reply if desired. Another type of existing text messaging is text voting. In this type, multiple choices of replies are provided when a text message is displayed. The user simply presses a key representing his/her reply and sends the reply back to the original sender.

ITR can be implemented as multiple rounds of text voting, with one main improvement: the multiple rounds of text voting should be handled as one session, rather than as multiple sessions. A new type, ITR, of text voting needs to be defined. When starting an ITR communication, the initiator sets the message type to be the ITR, generates a session ID and attaches the session ID to the text message. This session ID will be used by both text voting initiator and voter in the multiple rounds. In the context of the present invention, the text voting initiator is the Branch Data Server and the voter is the user of the mobile personal communication device.

Figure 5:
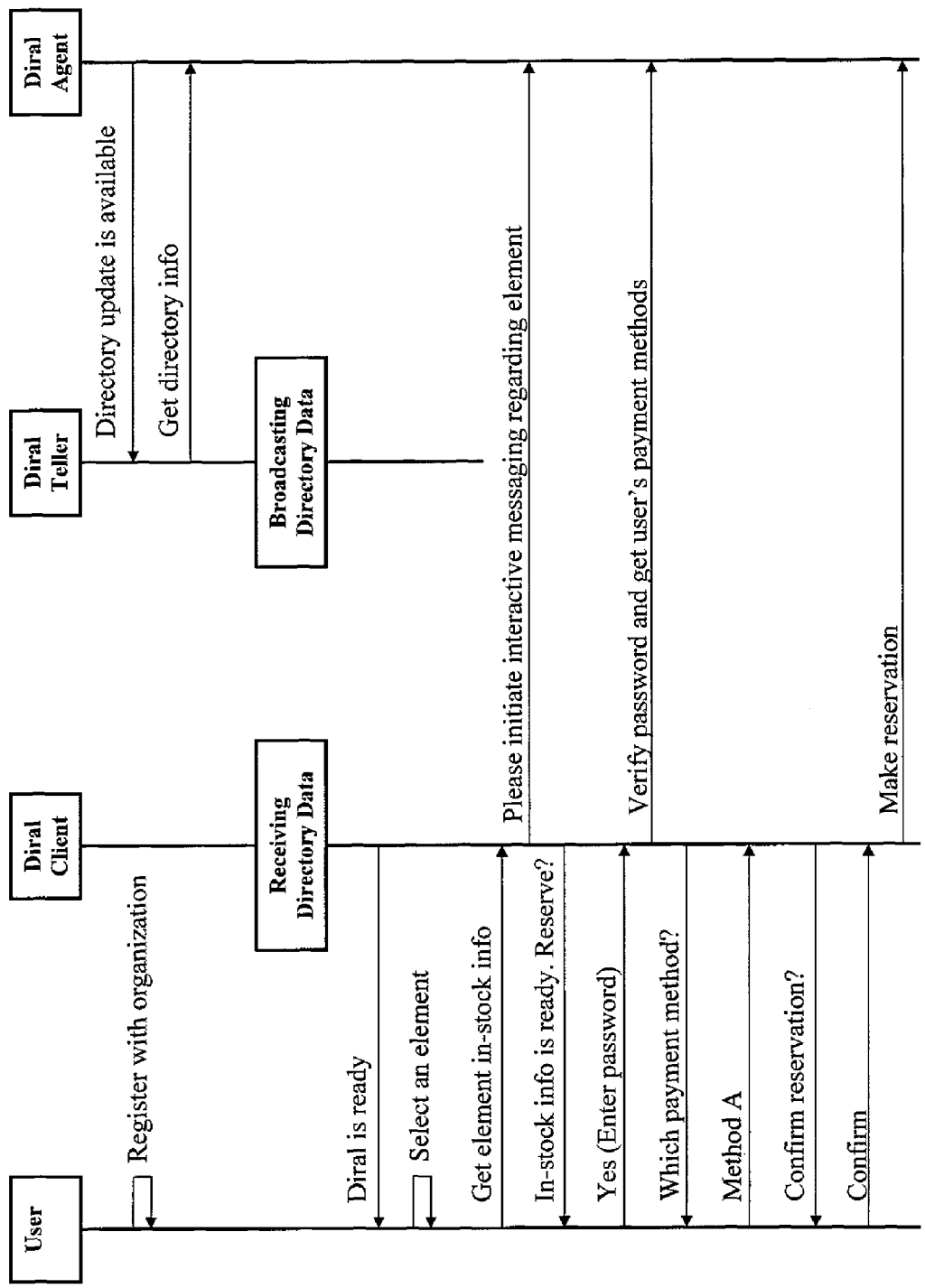
FIG. 5 is a sequence diagram that depicts an example where a user of a mobile personal communication device (Mobile Device) makes a reservation for a selected product via interactive messaging with a Branch Data Server.

FIG. 5 is a sequence diagram that depicts an example where a user of a Diral-enabled mobile device makes a reservation for a selected product via interactive messaging with a Branch Data Server.

The user needs to register the Diral-enabled mobile device with a Diral-enabled organization. The registration data includes the Mobile Device ID, credit card information and a password for security.

The Diral Agent notifies Diral Tellers within the branch of the readiness of the branch Directory. Upon receiving the readiness message, a Diral Teller downloads the Directory from the Branch Data Server. The Diral Teller then broadcasts the Directory data periodically.

When the user of a Diral-enabled mobile device approaches a Diral Teller, the Diral Client of the mobile device detects the Diral Teller's broadcast. The Diral Client receives and saves the Directory. When the whole Directory is received, the Diral Client displays a message and emits preferably an audible alert to inform "Diral is ready for use".

The user launches the Diral user interface and browses the branch Directory information. The user may look at product promotion, and check its price and location. In some circumstances, the user may want to make a reservation. In this case, the user presses a button on the mobile device to express the desire to make a reservation.

The Diral Client, upon getting the user's request, sends a message to the Diral Agent using the contact phone number provided in the static Directory. The message includes the ID of the product that is selected and the ID of the mobile device.

When the Diral Agent receives this message, it decodes the message, finds the product ID, retrieves the product stock information from the branch database, and sends this information back to the Diral Client on the mobile device.

The Diral Agent, if necessary, may also communicate with other Diral Agents located in other branches to query product in-stock information at these branches.

After receiving the reply message from the Diral Agent, the Diral Client displays the product stock information to the user and provides options for the user to enter a password to proceed with a reservation, or to stop the ongoing interactive messaging session.

The user enters a password and presses a button to select the option to continue. The Diral Client receives the password and then forwards the password to and queries the Diral Agent for available payment methods saved in the database. The Diral Agent carries out security check, retrieves the user's payment methods from the organization database and returns the payment methods to the Diral Client on the mobile device. The Diral Client then displays the payment methods to the user.

The user presses a key (or manipulates a trackball or thumbwheel) on the device to select a payment method. The Diral Client receives the selection and then asks the user for confirmation of the purchase. The user confirms. The Diral Client then sends a reservation message to the Diral Agent. The Diral Agent updates the database and completes the interactive purchasing process.

It is obvious for those skilled in the art that as the technology develops the basic idea of the invention can be implemented in various ways. The invention and the embodiments thereof are thus not restricted to the examples described above, but they may vary within the scope of the claims.

The invention claimed is:

1. A method of transmitting directory information from organization and branch data servers of an organization to a mobile personal communication device, the method comprising steps of:
   storing information about elements of interest for the organization in the organization data server;
   storing at least some of the elements of interest and branch-specific directory information of the organization in branch data servers located in local branches of the organization, the branch data servers being connected to the organization data server of the organization via a communication network; and
   providing, in each local branch, at least one access point for receiving branch directory data from the corresponding branch data server and for transmitting the directory data of the local branch to a mobile personal communication device configured to display, on a display of the mobile personal communication device, the directory information of the local branch.

2. The method as claimed in claim 1 wherein at least one of the access points at one of the local branches resides in the branch data server.

3. The method as claimed in claim 1 wherein the directory data is transmitted to the mobile personal communication device through a cable.

4. The method as claimed in claim 1 wherein the directory data is transmitted to the mobile personal communication device via a wireless link.

5. A method, performed by a mobile personal communication device, for enabling the mobile personal communication device to access directory information of an organization, the method comprising steps of:
   receiving directory data from an access point in a local branch of the organization at the mobile personal communication device, the access point receiving branch directory data from a branch data server communicatively connected to an organization data server of the organization; and
   displaying directory information on a display of the mobile personal communication device based on the directory data received from the access point.

6. The method as claimed in claim 5 further comprising steps of:
   registering the mobile personal communication device with the organization; and
   enabling a user of the mobile personal communication device to select a directory item and press an action button to request an interactive communication with the branch data server for causing the mobile personal communication device to send a user request to the branch data server that thus initiates an interactive communication session with the mobile personal communication device.

7. The method as claimed in claim 5 wherein the directory data is transmitted to a mobile personal communication device through a cable.

8. The method as claimed in claim 5 wherein the directory data is transmitted via a wireless link.

9. The method as claimed in claim 6 wherein the step of registering comprises a step of providing a unique ID associated with the mobile personal communication device to thereby set up an account with the organization, wherein the user further specifies payment options and other billing information.

10. The method as claimed in claim 6 wherein the request sent by the mobile personal communication device comprises the ID and location of the mobile personal communication device.

11. The method as claimed in claim 6 wherein the interactive communication session is performed via interactive voice response (IVR) or interactive text response (ITR).

12. A system for providing members of the public with directory information of an organization, for enabling a mobile personal communication device to access dynamic directory data of the organization and to interactively communicate with the organization, the system comprising:
   an organization data server for storing directory information of the organization;
   a plurality of branch data servers connected to the organization data server for storing branch directory data, and for interactively communicating with a mobile personal communication device;
   a plurality of access points for receiving branch directory data from the branch data server, and for transmitting the directory data;
   a plurality of mobile personal communication devices for receiving the directory information of a local branch from an access point, displaying the directory information, and interactively communicating with the branch data server.

13. The system as claimed in claim 12 wherein the access point resides in the branch data server.

14. The system as claimed in claim 12 wherein the directory data is transmitted to a mobile personal communication device through a cable.

15. The system as claimed in claim 12 wherein the directory data is transmitted via a wireless link.

16. The system as claimed in claim 12 wherein the mobile personal communication device sends a request for an interactive communication.

17. The system as claimed in claim 16 wherein the interactive communication is achieved via interactive voice response (IVR) or interactive text response (ITR).

18. A mobile device comprising a software component for accessing directory information stored on an organization data server or a branch data server of an organization, the device comprising:

a processor coupled to memory for supporting software applications;

a communication means for receiving directory data from an access point disposed in a branch of the organization; and a directory access software application that receives the directory data and displays directory information based on the directory data received from the access point.

19. The device as claimed in claim 18 wherein the communication means comprises a radiofrequency transceiver for wirelessly receiving the directory data.

20. The device as claimed in claim 18 wherein the communication means comprises a communication port for receiving directory data via cable.

21. The device as claimed in claim 18 further comprising a user input device for initiating an interactive communication via interactive voice response (IVR) or interactive text response (ITR).

22. A computer program product comprising code which, when loaded into memory and executed on a processor of a mobile personal communication device, is adapted to perform the steps of:

obtaining directory data from an access point that is communicatively connected to a branch data server located in a branch of an organization, the branch data server being communicatively connected to an organization data server of the organization; and displaying, on a display of the device, directory information based on at least some of the directory data received from the access point.

23. The computer program product as claimed in claim 22 wherein the code is further adapted to cause the device to wirelessly receive the data from the access point.

24. The computer program product as claimed in claim 22 wherein the code is further adapted to cause the device to receive the data over a cable connection from the access point.

25. The computer program product as claimed in claim 22 wherein the code is further adapted to enable the device to send a request for an interactive communication session via interactive text response (ITR) or interactive voice response (IVR).

* * * * *